ोगेन्द्र

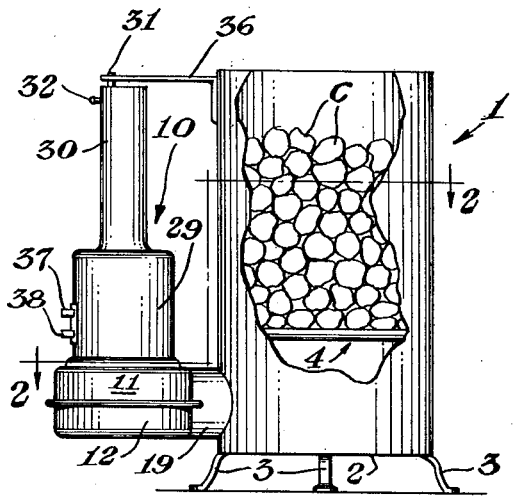

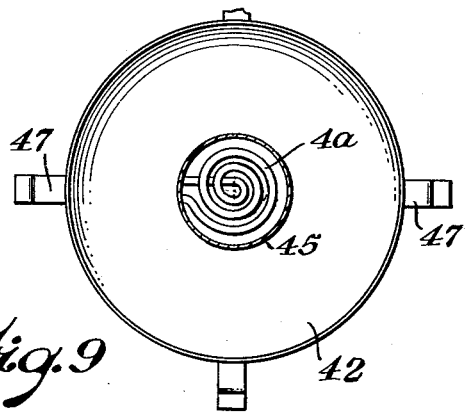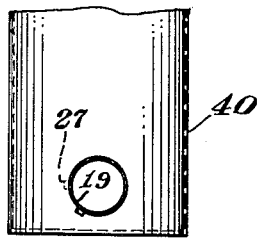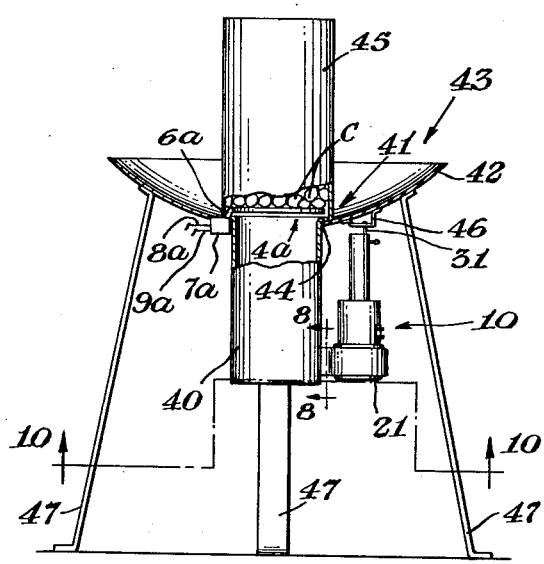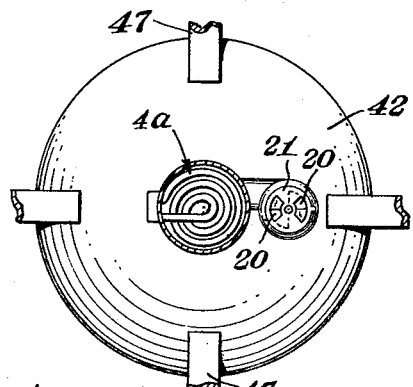

United States Patent Office 3,060,868
Patented Oct. 30, 1962

3,060,868
CHARCOAL IGNITING APPARATUS
Ernest E. MacLachlan, 211 Marquette St., Durand, Mich.
Filed May 5, 1960, Ser. No. 27,021
4 Claims. (Cl. 110—1)

This invention relates to apparatus for igniting charcoal and more particularly to an ignition device that is capable of starting charcoal burning rapidly in quantities adapted for use in domestic braziers and the like.

The use of charcoal grills or braziers for cooking has become increasingly popular during the past few years but there are several disadvantages of cooking with charcoal. Probably chief among the disadvantages of charcoal cooking are the difficulty and time required in igniting all of the fuel in a brazier. It is important that all of the fuel be ignited so as to provide as even a distribution of heat as is possible and various proposals have been advanced to accelerate the ignition of the charcoal. Such proposals usually require the addition of something to the charcoal, such as paper, kindling, or a combustible fluid, all of which must be ignited and caused to burn adjacent to the charcoal so as to ignite the latter. In the practice of such proposals, the paper, kindling, or combustible fluid usually burns for only a short duration of time and is quite likely to give off objectionable odors which may permeate the food intended to be cooked. In addition, such methods do not ignite the charcoal with any great rapidity.

An object of this invention is to provide apparatus which is capable of igniting charcoal quite rapidly and without imparting any foreign odors thereto.

Another object of the invention is to provide charcoal igniting apparatus which is easy to use, simple in construction and economical to manufacture.

A further object of the invention is to provide charcoal igniting apparatus wherein the charcoal to be ignited may be confined in a relatively small space so that each piece of charcoal contacts another, the apparatus employing forced draft means to accelerate the ignition of all of the pieces of charcoal.

Another object of the invention is to provide a charcoal igniting apparatus which may be formed either as part of a charcoal brazier or as a separate unit.

Still another object of the invention is to provide charcoal igniting apparatus wherein the ignition means need be actuated for only a very short period of time.

Other objects and advantages of the invention will be pointed out specifically or will become apparent from the following description when it is considered in conjunction with the appended claims and the accompanying drawings, in which:

FIGURE 1 is a side elevational view, partly broken away, illustrating a charcoal igniting unit formed in accordance with one embodiment of the invention;

FIGURE 2 is a sectional view taken on the line 2—2 of FIGURE 1;

FIGURE 3 is a bottom plan view of the blower element of the apparatus;

FIGURE 4 is a side elevational view, partly in section, of the element shown in FIGURE 3;

FIGURE 5 is a fragmentary, vertical sectional view of a portion of the apparatus shown in FIGURE 1;

FIGURE 6 is a schematic wiring diagram showing how the electrical components of the apparatus are interrelated;

FIGURE 7 is a side elevational view, with parts broken away, of another embodiment of the invention;

FIGURE 8 is a sectional view taken on the line 8—8 of FIGURE 7;

FIGURE 9 is a top plan view, partly in section, of the apparatus shown in FIGURE 7; and FIGURE 10 is a sectional view taken on the line 10—10 of FIGURE 7.

The embodiment of the invention disclosed in FIGURES 1-6 comprises a hollow, generally cylindrical housing 1 which may be open at its upper end and having a bottom 2 at its lower end to which is welded or otherwise suitably secured a plurality of supporting legs or feet 3. Mounted between the ends of the housing 1 and within the latter is an electrical heater 4 of known construction comprising a heating coil having a plurality of convolutions 5 of such size and number as to occupy a substantial cross-sectional area of the interior of the housing so as to permit a plurality of pieces of charcoal C to be supported in the housing on the heater. The ends 6 of the coil parallel one another and extend through suitably insulated openings (not shown) in the housing into a junction box 7 that is mounted on the outer wall of the housing. The junction box 7, along the wall of the housing 1, serves not only to support the heater 4 but also to provide a place to connect wires 8 and 9 which may in turn be connected to a suitable source of electric power.

Also forming part of the apparatus disclosed in FIGURES 1-6 is an air blower 10 having a pair of substantially cup-shaped, hollow elements 11 and 12 secured to one another to form a compartment for a rotary fan 13 having blades 14 mounted on a shaft 15 that is capable of being driven in a clockwise direction, as viewed in FIGURE 2, by an electric motor 16 connected by wires 17 and 18 and the wires 8 and 9 to the power source. The members 11 and 12 include a generally tangentially arranged air delivery nozzle 19 adapted to communicate with the interior of the housing 1 and through which air may be discharged from the interior of the fan compartment to the interior of the housing 1. Air may enter the fan compartment through openings 20 formed in the bottom of the part 12 and the amount of air introduced to the fan housing may be regulated by a valve element 21 having openings 22 adapted to register with the openings 20, but the valve 21 may be rotated about the axis of a pin 23 so as to cover either partially or wholly the openings 20. The valve element 21 may include a finger piece 24 to facilitate its manipulation.

As is best shown in FIGURE 5, the wall of the housing 1 is provided with an opening 25 that is adapted to receive the free end of the delivery tube 19. The opening 25 includes a radially offset slot 26 that is adapted to receive a flange 27 which is joined to and parallels the air delivery tube 19. The flange 27 is provided with a notch 28 adjacent to the forward end of the tube 19, the size of the notch 28 being such as to correspond substantially to the thickness of the wall of the housing 1 so as to permit the nozzle 19 to be rotated relatively to the housing 1 with the wall of the housing being received in the notch 28. The flange 27 and the housing wall thus form engageable and disengageable means for releasably holding the nozzle in the opening 25.

The motor 16 of the air delivery means is mounted within a motor casing 29 that is integrally joined to the upper fan compartment section 11, and integrally joined to the upper end of the motor casing 29 is an extension 30 which may serve as a handle for the apparatus. Mounted within the handle extension 30 is a slidable bolt 31 having an operating part 32 projecting through an opening 33 in the extension 30. The bolt 31 normally is urged to an extended position, as shown in FIGURES 1 and 4, by a spring 34 which reacts between one end of the bolt 31 and the base of a slide member 35 in which the bolt is mounted. The projecting end of the bolt is adapted to extend through an opening formed in a bolt keeper plate 36 that is welded or otherwise suitably secured adjacent to the upper end of the housing 1.

When the parts of the apparatus are assembled in the manner disclosed in FIGURE 1, charcoal may be introduced to the housing through the open, upper end of the latter and be supported by the heater 4. The wires 8 and 9 then may be connected to a source of electric energy and an operating switch 37 may be closed so as to cause the coil of the heater to become incandescent. Those pieces of charcoal in engagement with the heater soon will become ignited. Then the switch 37 may be opened and a switch 38 closed to supply power to the motor 16 to cause the latter to drive the fan 13, whereupon a forced draft of air will be delivered to the interior of the housing 1 below the charcoal and blow upwardly through the charcoal to accelerate the ignition of all of the pieces of charcoal. When the charcoal has been ignited, the contents of the housing 1 may be emptied into a brazier or the like and the cooking of food begun.

In the embodiment of the inventoin shown in FIGURES 7–10 the blower unit 10 is identical to the unit previously described and is adapted to be mounted in a similar manner in an opening similar in all respects to the opening 25 formed in a lower, cylindrical element 40 of a two-piece housing 41. The upper end of the housing member 40 extends through an opening provided in the bottom of a pan 42 forming part of a charcoal brazier 43, the upper end of the member 40 being flanged as at 44 so as to be supported by the pan 42. Over the opening in the pan 42 is mounted a heater 4a similar in all respects to the heater 4 and having the ends 6a of its coil anchored to a block 7a that is secured to the pan 42 and from which wires 8a and 9a extend, the wiring of the parts 4a and 10 being similar to the wiring of the parts 4 and 10 previously described.

The second part of the two-piece housing 41 comprises a hollow sleeve 45 which is adapted to fit over the heater 4a and serve as a receptacle for pieces of charcoal C. As is the case with the embodiment shown in FIGURES 1–5, the pieces of charcoal are supported by the heater 4a.

The blower 10 may be removably supported on the brazier 43 by means of the cooperation of the communicating nozzle 19 with the wall of the housing member 40 and by the action of the bolt 31 which may extend through an opening formed in a bracket 46 that is mounted on the lower surface of the pan 42. The pan 42 may be supported above the ground by suitable legs 47.

When the parts of the apparatus are assembled in the manner shown in FIGURE 7, charcoal contained within the housing 41 and in engagement with the heater 4a may be ignited by actuation of the heater. When the charcoal has become ignited, the heater may be deactivated and the blower 10 activated, by operation of the switches 37 and 38, so as to cause air to be delivered into the housing 41 below the heater 4a and then upwardly through the charcoal C. When the charcoal has been ignited, the housing member 45 may be lifted, whereupon the charcoal will distribute itself over the base of the pan 42, and cooking operations then may begin.

The disclosed embodiments are representative of presently preferred forms of the invention, but are intended to be illustrative rather than definitive thereof. The invention is defined in the claims.

I claim:

1. Charcoal or the like igniting apparatus comprising a portable hollow housing having at least one open end through which charcoal or the like may be introduced to the interior of said housing; heater means comprising a heating coil having a plurality of closely spaced convolutions all lying in substantially the same plane and having openings therebetween; means mounting said heater means in said housing between the ends thereof, said convolutions together occupying substantially the entire cross-sectional area of said housing and providing the sole support for charcoal in said housing; means for operating said heater means to ignite the charcoal supported thereby; air blower means; conduit means communicating with said blower means and the interior of said housing below said heater means for delivering air to said housing at a level below the charcoal supported by said convolutions and at a pressure such as to cause said air to blow through the openings between said convolutions and between adjacent pieces of charcoal; and means for mounting said blower means on said housing.

2. The apparatus set forth in claim 1 wherein said mounting means for said blower means includes said conduit means and a releasable latch device interconnecting said blower means and said housing and operable to enable said blower means to be demounted from said housing.

3. The apparatus set forth in claim 1 wherein said housing has a second opening therein to accommodate said conduit means; said housing and said conduit means having engageable and disengageable locking means for respectively locking and unlocking said conduit means in said second opening.

4. The apparatus set forth in claim 1 wherein said air blower means includes a body member forming a handle for said housing.

References Cited in the file of this patent

UNITED STATES PATENTS

| | | |
|---|---|---|
| 20,149 | Devin | May 4, 1858 |
| 309,263 | Tousley | Dec. 16, 1884 |
| 390,997 | Tousley | Oct. 9, 1888 |
| 884,481 | Glaus | Apr. 14, 1908 |
| 2,234,004 | Lamm | Mar. 4, 1941 |
| 2,767,905 | Creed | Oct. 23, 1956 |
| 2,780,218 | Allen | Feb. 5, 1957 |
| 2,866,883 | Borden | Dec. 30, 1958 |
| 2,938,988 | McCutcheon et al. | May 31, 1960 |